E. T. SHEPARD.
SHEET METAL PULLEY.
APPLICATION FILED MAY 28, 1907.
953,011.
Patented Mar. 22, 1910.
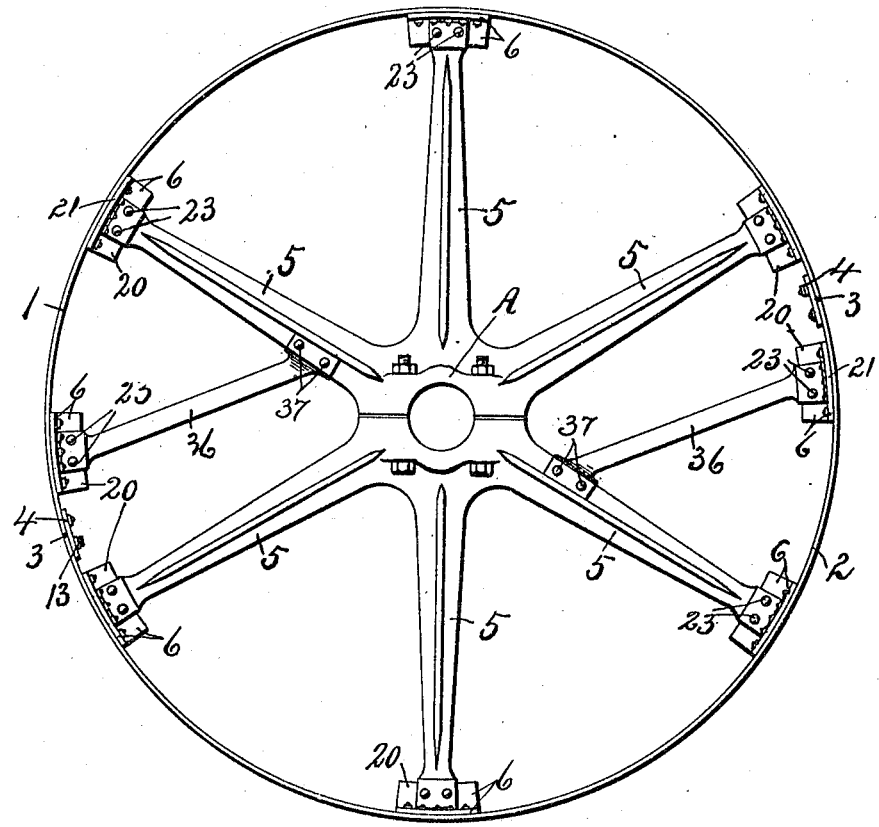

UNITED STATES PATENT OFFICE.

EDGAR T. SHEPARD, OF ONEIDA, NEW YORK, ASSIGNOR TO ONEIDA STEEL PULLEY COMPANY, OF ONEIDA, NEW YORK, A CORPORATION OF NEW YORK.

SHEET-METAL PULLEY.

953,011. Specification of Letters Patent. Patented Mar. 22, 1910.

Application filed May 28, 1907. Serial No. 376,131.

*To all whom it may concern:*

Be it known that I, EDGAR T. SHEPARD, of Oneida, in the county of Madison, in the State of New York, have invented new and useful Improvements in Sheet-Metal Pulleys, of which the following, taken in connection with the accompanying drawings, is a full, clear, and exact description.

This invention relates to certain improvements in split sheet metal pulleys and refers more particularly to certain reinforcing elements for bracing the sheet metal rim against radial and lateral strains. In pulleys of this character in which a minimum weight and maximum strength are essential considerations, the rim and spokes are necessarily made of comparatively light sheet metal and in order that the radial and lateral strains due to the action of the belt on the rim may be properly resisted without adding undue weight to the pulley, I have sought to distribute these strains from the points where they are most excessive. For example, in the larger sizes of pulleys it is quite impossible to arrange the spokes at opposite sides of the meeting edges of the split rim sufficiently close to prevent springing of said meeting edges under the compression strains of the belt.

My object, therefore is to reinforce the rim against such radial compressions and lateral strains near the meeting edges.

Other objects and uses will be brought out in the following description.

In the drawing is shown an end elevation of a complete pulley embodying the features of my invention.

In the drawing I have shown the adjacent meeting ends of opposite half sections —1— and —2— of a sheet metal rim which is divided at —3— to form such sections, said meeting ends of the rim sections being clamped together by a reinforcing plate —4— and each rim section is connected to a suitable hub A by spokes —5— and reinforcing plates —6— by which the spokes are fastened to the corresponding rim section. These spokes —5— and the corresponding reinforcing plates —6— are necessarily spaced some distance apart at the rim particularly in large size pulleys and if placed equidistant from the division line —3— the compression strain of the belt at such meeting ends would tend to spring the latter inwardly while the torsional strain of such belt would also tend to produce excessive shearing strains upon the rivets or bolts by which the clamping plates —4— are secured.

The plate —4— is permanently secured to one of the meeting edges of the rim. The opposite side of the plate —4— is preferably detachably secured to the adjacent meeting end of the opposite rim section so as to permit the rim sections to be readily separated when desired, such securing means consisting of threaded bolts having nuts —13—. The plates —6— for attaching the spokes to the rim are also made of sheet metal of suitable length, each having its intermediate portions bent upon itself forming a closed U-shape radial flange —20—, and lateral flanges —21— of substantially the same dimensions, the flange —20— constituting a reinforcing rib for the rim and at the same time affording means for securing the adjacent end of the spokes —5— to the rim by clamping bolts or rivets —23—.

By reference to the drawing, it will be observed that one of the spokes is attached by a plate —6— to one rim section close to the meeting edge —3— while the other spoke is a considerable distance from said meeting edge and in order to prevent undue radial springing strain upon the rim section —2—, I provide a brace or diagonal arm —36— having one end secured by rivets —37— to the adjacent spoke —5— some distance inwardly from the rim while the outer end of said brace or arm is secured to the rim near the meeting edge —3— by means of one of the plates —6— previously described, the means for attaching the outer end of the arm to the rim being substantially the same as that employed for attaching one of the spokes to the rim and the same reference numerals will, therefore, apply. It is to be understood, of course, that in order to properly balance the pulley, the brace —36— and spoke —5— to which it is attached are duplicated at the diametrically opposite side of the pulley as shown in the drawing.

What I claim is:

In combination with the opposite rim sections of a split sheet metal rim, spokes therefor, one of the spokes being secured to one rim section near its meeting edge and another spoke being secured to the other rim section some distance from the meeting edge, and a brace having one end secured to the spoke of the latter rim section and its outer end secured to the same rim section near its meeting end.

In witness whereof I have hereunto set my hand this 22nd day of May 1907.

EDGAR T. SHEPARD.

Witnesses:
HARRY W. FISHER,
O. W. STURDEVANT.